(12) United States Patent
Doujou et al.

(10) Patent No.: US 8,427,745 B2
(45) Date of Patent: Apr. 23, 2013

(54) TELESCOPE

(75) Inventors: Naoto Doujou, Utsunomiya (JP); Toru Matsuda, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 12/572,175

(22) Filed: Oct. 1, 2009

(65) Prior Publication Data

US 2010/0085634 A1    Apr. 8, 2010

(30) Foreign Application Priority Data

Oct. 3, 2008  (JP) ................................ 2008-258253

(51) Int. Cl.
*G02B 13/10*    (2006.01)
*G02B 23/00*    (2006.01)

(52) U.S. Cl.
USPC .......................................... 359/433; 359/399

(58) Field of Classification Search ........... 359/399–435
See application file for complete search history.

(56) References Cited

U.S. PATENT DOCUMENTS

| 6,038,068 A | 3/2000 | Takeshi et al. | |
|---|---|---|---|
| 2006/0018012 A1* | 1/2006 | Smith et al. | 359/366 |
| 2009/0015914 A1* | 1/2009 | Duncan et al. | 359/399 |

* cited by examiner

*Primary Examiner* — Stephone B. Allen
*Assistant Examiner* — Tamara Y Washington
(74) *Attorney, Agent, or Firm* — Carter, DeLuca, Farrell & Schmidt LLP (57) ABSTRACT

A telescope includes: a concave mirror reflecting light from an object; an image pickup element receiving light from the mirror; a compensation optical system for guiding light from the mirror to the image pickup element; a lens barrel integrally holding the image pickup element and the compensation optical system; and a drive mechanism for driving the lens barrel to change the angle of the optical axis of the compensation optical system with respect to the optical axis of the concave mirror.

10 Claims, 9 Drawing Sheets

FIG. 5A (0 DEGREES)
FIG. 5B (0.75 DEGREES)
FIG. 5C (-0.75 DEGREES)
FIG. 5D (0.675 DEGREES)

FIG. 10A (0 DEGREES)
FIG. 10B (0.75 DEGREES)
FIG. 10C (-0.75 DEGREES)
FIG. 10D (0.675 DEGREES)

FIG. 11

TELESCOPE

BACKGROUND OF THE INVENTION

1. Field of the Invention

The present invention relates to a telescope used for observation of an object and a compensation optical system in the telescope.

2. Description of the Related Art

An astronomical telescope is known, as an astronomical telescope for astronomical observation, which includes a primary mirror reflecting and imaging light beam from astronomical objects, a refractive optical system arranged at a principal focal point of the primary mirror or in the vicinity thereof, and an image pickup element photoelectrically converting an image formed.

In astronomical observation other than the zenith, the imaging position for light varies from color to color due to atmospheric dispersion, so that a deviation occurs in an observed star image due to a difference in the wavelength of light. In order to compensate degradation in optical performance due to such atmospheric dispersion, there is known an astronomical telescope in which an aberration compensation system (principal focal point compensation optical system) is provided at a focal point of the primary mirror or in the vicinity thereof (U.S. Pat. No. 6,038,068).

In the principal focal point compensation optical system disclosed in U.S. Pat. No. 6,038,068, a compound lens consisting of a pair of lenses made of materials different in dispersion from each other is provided in an optical path. The compound lens is rotated about the center of curvature of light entrance and exit surfaces thereof as the center of rotation, or moved in a direction perpendicular to the optical axis, to compensate the atmospheric dispersion.

The viewing angle diameter of the astronomical telescope using the principal focal point compensation optical system of U.S. Pat. No. 6,038,068 is 0.5 degrees. Recently, further improvement in survey performance of the astronomical telescope has been desired. To do this requires the principal focal point compensation optical system, which compensates aberrations caused by the primary mirror and chromatic aberration due to atmospheric dispersion, to widen the visual field of observation and improve optical performance.

Wider field of view and higher performance result in increase in the number of lenses that construct the principal focal point compensation optical system. As the number of lenses that construct the principal focal point compensation optical system increases, the principal focal point compensation optical system becomes heavier. In astronomical observation, if tracking observation of a star image located other than the zenith is carried out, a structure (lens barrel) supporting the primary mirror, the image pickup element, and the principal focal point compensation optical system tilts with respect to the zenith. The tilt results in self-weight deformation, and if this self-weight deformation causes a relative tilt between the image pickup element and the principal focal point compensation optical system to produce decentering aberration, the imaging performance is degraded.

SUMMARY OF THE INVENTION

A telescope having an aberration compensation function of the present invention includes: a mirror reflecting light from an object; an image pickup element receiving light from the mirror; a compensation optical system for guiding light from the mirror to the image pickup element; a lens barrel integrally holding the image pickup element and the compensation optical system; and a drive mechanism for driving the lens barrel to change the angle of an optical axis of the compensation optical system with respect to an optical axis of the mirror.

Further features of the present invention will become apparent from the following description of exemplary embodiments with reference to the attached drawings.

DESCRIPTION OF THE EMBODIMENT

In a telescope (astronomical telescope) of the present invention, degradation in imaging performance due to self-weight deformation caused when the entire telescope (lens barrel) is tilted is suppressed. Specifically, degradation in the imaging performance of a compensation optical system due to self-weight deformation of the compensation optical system is suppressed, and degradation in imaging performance due to a change in relative position (angle, distance) between the compensation optical system and an image pickup element is suppressed.

To this end, the telescope of the present invention includes a mirror (concave mirror or mirror having a curvature), which reflects light from an object, the image pickup element receiving light from the mirror, the compensation optical system for guiding light from the mirror to the image pickup element, and a lens barrel integrally holding the image pickup element and the compensation optical system. This telescope also includes a drive mechanism for driving this lens barrel to change the angle of the optical axis of the compensation optical system with respect to the optical axis of the mirror. Here, a mechanism for tilting (or moving) the compensation optical system based on the tilt of the entire telescope independently of the tilt of the entire telescope is called an aberration compensation mechanism (aberration reduction mechanism). This aberration compensation mechanism (or another aberration compensation mechanism) can make some optical system (optical elements) in the compensation optical system eccentric (or moved) in a direction perpendicular to the optical axis of the compensation optical system. The eccentricity may vary according to the tilt of the entire telescope.

In the telescope mentioned above, the compensation optical system of the present invention can change the tilt relative to (a primary mirror of) the telescope according to the tilt of the entire telescope. Further, some optical system (optical elements) in the compensation optical system can be made eccentric (or moved) in a direction perpendicular to the optical axis of the compensation optical system according to the tilt of the entire telescope. The eccentricity may vary according to the tilt of the entire telescope.

In an astronomical telescope (compensation optical system) of the embodiment to be described below, the compensation optical system (principal focal point compensation optical system) and the image pickup element are integrally housed in and supported by the lens barrel that holds these elements, but these elements may, of course, be supported by different support mechanisms, respectively.

<Embodiment>

Figure 1:
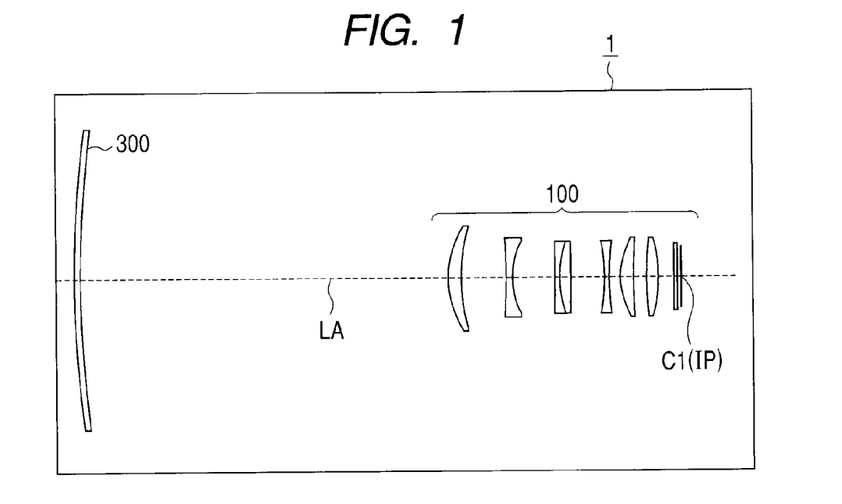
FIG. 1 is a schematic view of an essential portion of an astronomical telescope according to an embodiment.

FIG. 1 is a schematic view of an essential portion of an astronomical telescope (reflecting telescope) having a principal focal point compensation optical system (compensation optical system) according to an embodiment.

In FIG. 1, an astronomical telescope 1 includes a primary mirror 300 and a principal focal point compensation optical system 100. The primary mirror 300 has a shape of concave hyperboloid of revolution. The principal focal point compensation optical system 100 is arranged at the focal point of the primary mirror 300 or in the vicinity thereof to compensate aberrations produced by the primary mirror 300.

The principal focal point compensation optical system 100 has a compensation lens for compensating chromatic aberration due to atmospheric dispersion.

Light beam from astronomical objects enters the primary mirror 300 from the right side of FIG. 1 and then is reflected by the primary mirror 300, and forms an image on an image plane IP via the principal focal point compensation optical system 100. Thus, in FIG. 1, the left-hand side of the principal focal point compensation optical system 100 is the primary mirror side and the right-hand side is the image plane side.

Figure 2:
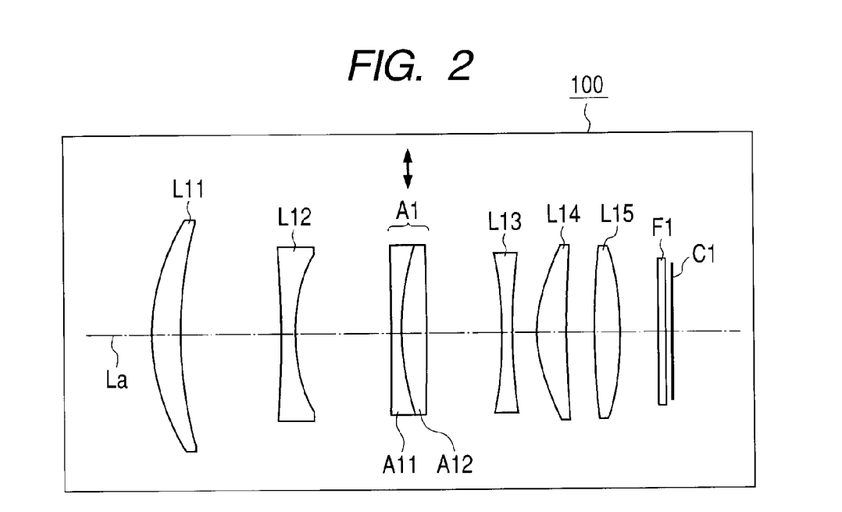
FIG. 2 is a view illustrating the lens arrangement of a principal focal point compensation optical system used in the astronomical telescope according to the embodiment.

FIG. 2 is a lens sectional view illustrating the structure of the principal focal point compensation optical system 100 in more detail. The principal focal point compensation optical system 100 has a compound lens including a pair of lenses made of materials different in dispersion from each other. The principal focal point compensation optical system 100 has lenses L11-L15 for compensating aberrations produced by the primary mirror 300, and lenses A11 and A12 for compensating atmospheric dispersion.

The lens A11 and the lens A12 form a compound lens (compensation lens, i.e., atmospheric dispersion compensation lens) A1 for compensating chromatic aberration due to atmospheric dispersion.

Denoted by F1 are a filter for selecting a transmitting wavelength band and a plane-parallel plate whose thickness corresponds to that of a dewar window for the image pickup element. An image pickup element (CCD) C1 is placed on an imaging plane of the astronomical telescope 1. The respective concave and convex shapes of the lenses L11-15 are set properly.

Specifically, the lens L11 is a meniscus positive lens whose center of curvature is disposed on the image plane side. The lens L12 is a biconcave negative lens. The lens L13 is a biconcave negative lens. The L14 is a meniscus positive lens whose center of curvature is disposed on the image plane side. The lens L15 is a positive lens.

The principal focal point compensation optical system 100 has such an atmospheric dispersion compensation function even with a smaller number of lenses, forming part of the astronomical telescope 1 having a large viewing angle.

The compound lens A1 is moved by a moving mechanism (drive unit), not shown, to have components in directions (directions of arrow in FIG. 2) perpendicular to the optical axis in order to compensate color shift (chromatic aberration) due to atmospheric dispersion.

The compound lens A1 consists of a positive lens and a negative lens. The positive lens and the negative lens are bonded or disposed with an air layer therebetween in such a manner that the surfaces having curvatures will face each other. The light entrance surface of the compound lens A1 is a flat plane or a surface whose curvature radius is equal to or more than 20 times as large as the curvature radius of a surface having a curvature where the positive lens and the negative lens face each other.

The compound lens A1 shown in FIG. 2 is so constructed that the pair of negative lens A11 and positive lens A12, close in refractive index to each other but different in dispersion from each other, are placed close to each other with a slight air layer therebetween.

Specifically, the material of the negative lens A11 has a refractive index nd of 1.51633 and an Abbe number υd of 64.2. The material of the positive lens A12 has a refractive index nd of 1.53172 and an Abbe number υd of 49.0.

These optical glasses are so combined that the compound lens A1 will be moved in a direction orthogonal to the optical axis La to produce certain aberration in order to compensate atmospheric dispersion.

If the negative lens A11 and the positive lens A12 are bonded, the compound lens A1 will have the same effect.

The refractive index nd of the material is a refractive index for d-line (587.6 nm). The Abbe number υd is defined as follows:

$$\upsilon d=(nd-1)/(nF-nC)$$

nd: Refractive index for d-line (587.6 nm)
nF: Refractive index for F-line (486.1 nm)
nC: Refractive index for C-line (656.3 nm)

Table-1 lists numerical data on the astronomical telescope 1 of the embodiment, where R is the paraxial curvature radius of an optical surface and d is the surface interval. As lens materials, three kinds of optical glasses including quartz are used. Specifically, quartz (SILICA) has a refractive index nd of 1.45846 and an Abbe number υd of 67.8.

Optical glass BSL7Y has a refractive index nd of 1.51633 and an Abbe number υd of 64.2. Optical glass PBL1Y has a refractive index nd of 1.54814 and an Abbe number υd of 45.8. The names of optical glasses used in the embodiment are glass names of OHARA Inc., but equivalent products from other manufacturers may also be used.

In the table, the compound lens A1 for atmospheric dispersion compensation is abbreviated as ADC (which stands for Atmospheric Dispersion Compensator).

The principal focal point compensation optical system 100 of the embodiment has a total of five aspheric surfaces. The aspherical shape is expressed by the following equation:

$$z = \frac{(1/R)h^2}{1 + \sqrt{1 - (1+k)(h/R)^2}} + Ah^4 + Bh^6 + Ch^8 + Dh^{10} + Eh^{12} + Fh^{14} + Gh^{16},$$

< Equation 1 > where z axis is the optical axis direction, h axis is the direction perpendicular to the optical axis, the direction of light travel is positive, R represents the paraxial curvature radius, k represents the conic constant, and A to G represent the 4th-order to 16th-order aspherical coefficients.

Further, in Table-1, f represents the combined focal length of the primary mirror 300 and the principal focal point compensation optical system 100, FNO represents F-number, ω represents the half angle of field, and 2ω represents the total angle of field (i.e., the angle of view).

TABLE 1

Numerical Embodiment 1
f = 18415.7 mm  FNO = 2.24  2ω = 1.5 degrees

| Surface No. | R Curvature Radius | d Surface Interval | Material | Effective Diameter |
|---|---|---|---|---|
| 1 (primary mirror) | 30000.0000 (aspheric surface) | 13455.0000 | | 8200.0 |
| 2 | 766.0266 | 100.0000 | SILICA | 820.0 |
| 3 | 1442.4220 (aspheric surface) | 357.5538 | | 810.1 |
| 4 | −3930.6400 (aspheric surface) | 50.0000 | BSL7Y | 619.6 |
| 5 | 636.8541 | 345.0769 | | 574.6 |
| 6 (ADC) | −22788.0000 | 33.800 | BSL7Y | 611.0 |
| 7 (ADC) | 1016.3880 | 3.0000 | | 611.0 |
| 8 (ADC) | 1000.0000 | 84.5000 | PBL1Y | 611.9 |
| 9 (ADC) | −36767.0000 | 270.2019 | | 611.2 |
| 10 | −1194.1800 (aspheric surface) | 34.0000 | PBL1Y | 558.7 |
| 11 | 2039.3880 | 88.34707 | | 570.6 |
| 12 | 486.0993 (aspheric surface) | 107.0000 | BSL7Y | 630.4 |
| 13 | 4553.9720 | 100.0000 | | 587.1 |
| 14 | 2772.1390 | 90.0000 | SILICA | 627.2 |
| 15 | −11417.7800 (aspheric surface) | 131.5184 | | 612.5 |
| 16 (Filter) | Infinity | 30.0000 | SILICA | 522.6 |
| 17 (Filter) | Infinity | 20.0000 | | 512.1 |
| 18 Image Plane | Infinity | — | — | 501.8 |

(Aspheric Surface)

| Surface 1 | k | A (4th) | B (6th) | C (8th) |
|---|---|---|---|---|
| | −1.00835 | 0.00000 | 0.00000 | 0.00000 |
| | D (10th) | E (12th) | F (14th) | G (16th) |
| | 0.00000 | 0.00000 | 0.00000 | 0.00000 |

| Surface 3 | k | A (4th) | B (6th) | C (8th) |
|---|---|---|---|---|
| | −5.4155 | 7.5590E−11 | −2.6986E−16 | 1.4548E−22 |
| | D (10th) | E (12th) | F (14th) | G (16th) |
| | 1.6180E−27 | −1.4107E−32 | 6.0978E−38 | −1.0575E−43 |

| Surface 4 | k | A (4th) | B (6th) | C (8th) |
|---|---|---|---|---|
| | 0.00000 | 5.1374E−11 | 2.7418E−16 | 3.5105E−21 |
| | D (10th) | E (12th) | F (14th) | G (16th) |
| | −1.7968E−26 | 2.2028E−31 | −1.2644E−36 | 2.6424E−42 |

TABLE 1-continued

Numerical Embodiment 1
f = 18415.7 mm FNO = 2.24 2ω = 1.5 degrees

| Surface 10 | k | A (4th) | B (6th) | C (8th) |
|---|---|---|---|---|
| | 0.00000 | 2.1635E−09 | −4.1700E−14 | 6.1729E−18 |
| | D (10th) | E (12th) | F (14th) | G (16th) |
| | −9.4864E−24 | 1.0464E−28 | −6.9534E−34 | 2.0629E−39 |
| Surface 12 | k | A (4th) | B (6th) | C (8th) |
| | 0.00000 | −3.8482E−09 | 3.169E−14 | −5.1942E−18 |
| | D (10th) | E (12th) | F (14th) | G (16th) |
| | 6.9519E−23 | −6.7338E−29 | 3.8852E−34 | −9.9734E−40 |
| Surface 15 | k | A (4th) | B (6th) | C (8th) |
| | 0.00000 | −1.1736E−09 | 1.0465E−14 | −3.5038E−19 |
| | D (10th) | E (12th) | F (14th) | G (16th) |
| | 7.7030E−24 | −9.6572E−29 | 6.5967E−34 | −1.9007E−39 |

Figure 3:
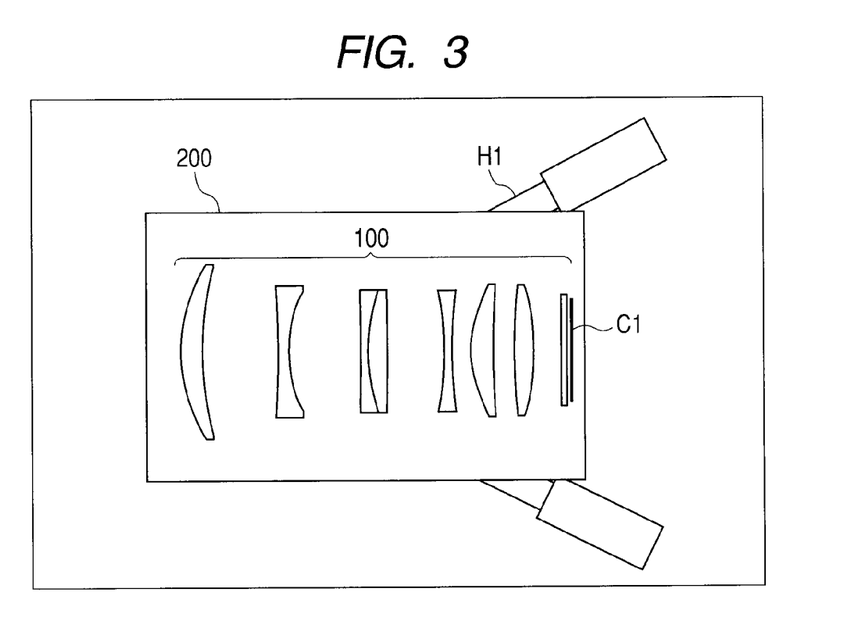
FIG. 3 is a conceptual view of supporting a principal focal point compensation optical system 100 and an image pickup element C1 according to the embodiment.

FIG. 3 is a conceptual view of supporting the principal focal point compensation optical system 100 and the image pickup element C1, which are housed in and held by the lens barrel 200.

The principal focal point compensation optical system 100 and the image pickup element C1 are supported by a support structure H1 attached to the lens barrel 200.

When the astronomical telescope 1 is tilted with respect to the zenith to give a tilt to the lens barrel 200 relative to the zenith, since the principal focal point compensation optical system 100 and the image pickup element C1 are different in distance from the center of gravity of the lens barrel 200, a relative tilt occurs.

Figure 4:
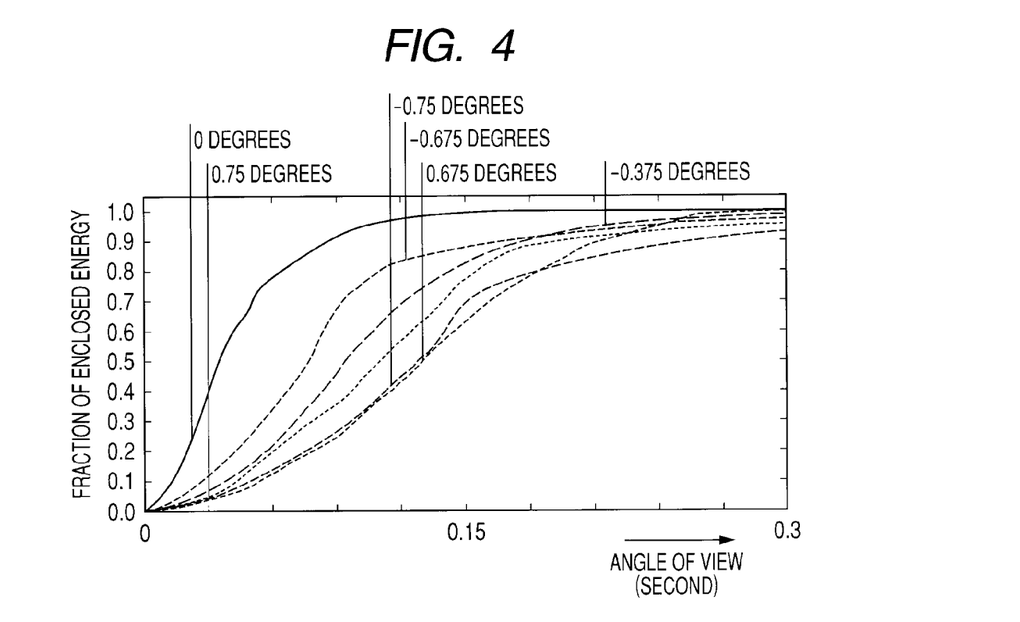
FIG. 4 is a graph illustrating imaging performance of the astronomical telescope according to the embodiment when the zenith angle is 30 degrees and the wavelength band ranges from 570 to 670 nm.
Figure 5A:
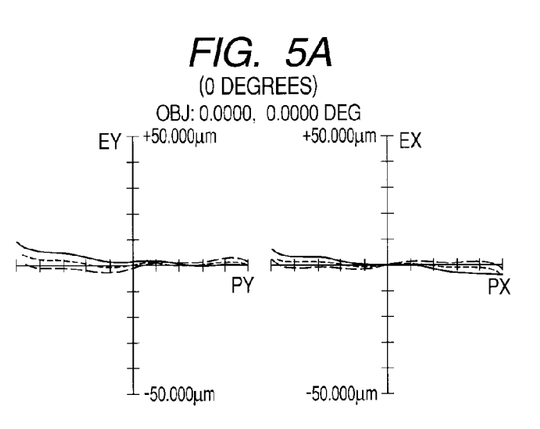
FIGS. 5A, 5B, 5C and 5D are lateral aberration graphs of the astronomical telescope according to the embodiment when the zenith angle is 30 degrees and the wavelength band ranges from 570 to 670 nm.
Figure 5B:
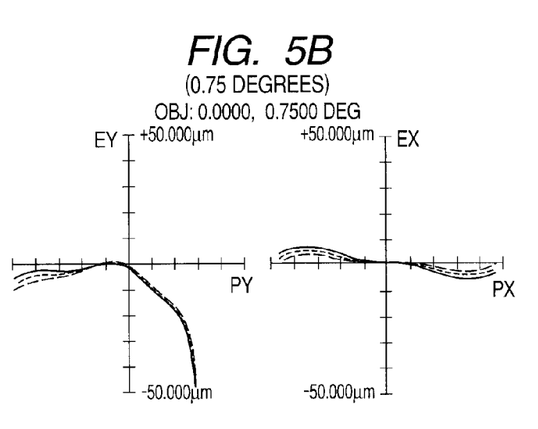
Figure 5C:
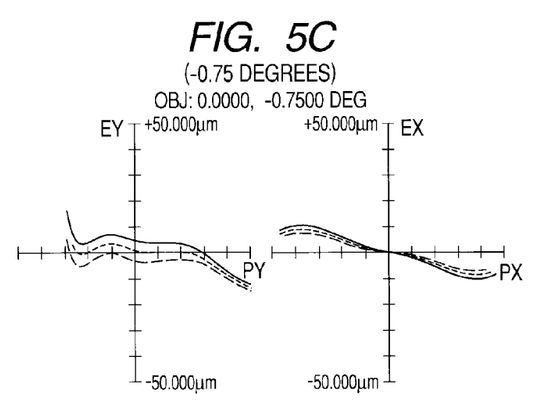
Figure 5D:
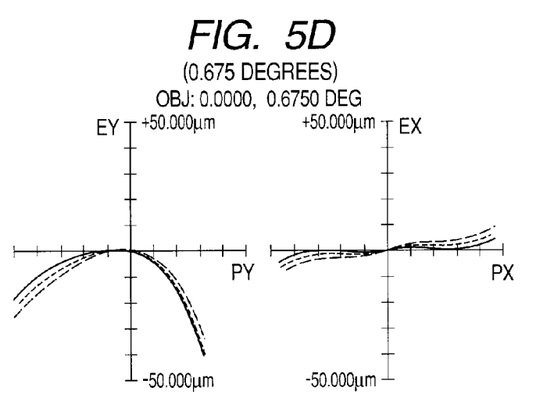

FIG. 4 is an explanatory graph illustrating imaging performance when the zenith angle is 30 degrees, the wavelength band ranges from 570 to 670 nm, and there is no relative tilt between the principal focal point compensation optical system 100 and the image pickup element C1.

The horizontal axis represents values of angles of field (seconds) as star image radiuses on the image plane, and the vertical axis represents the fraction of energy focused on the star image radiuses. The lines in FIG. 4 represent data at infinity with viewing angles of 0, −0.375, ±0.675, and ±0.75 degrees, respectively.

Although the reflecting telescope 1 works in a wide range of wavelengths of about 360 to 1100 nm, a wavelength range for a red filter (570 nm to 670 nm), in which degradation of optical performance tends to cause a problem, is illustrated here as a representative example.

The distance between the primary mirror 300 and the compensation optical system 100 is 13455.0215 mm, and the compound lens A1 has the maximum moving distance, 20.8 mm, in the direction perpendicular to the optical axis of the compound lens A1. In this case, since 80 percent of energy of light at each viewing angle is within a star image radius of 0.185 seconds, the imaging performance thereof is good.

FIGS. 5A to 5D are lateral aberration graphs when distances to objects are infinite on condition that there is no relative tilt between the principal focal point compensation optical system 100 and the image pickup element C1.

FIGS. 5A, 5B, 5C, and 5D represent cases where viewing angles are 0, 0.75, −0.75, and 0.675 degrees, respectively, in this order. In FIGS. 5A, 5B, 5C, and 5D, the aberrations for the beam in X-section including the optical axis and for the beam in Y-section including the optical axis and perpendicular to the X-section are shown as EX and EY, respectively. In these drawings, the vertical axis indicates the amount of aberration (−50·m to +50·m) and the horizontal axis indicates angles of the beams in X- and Y-sections. That is, the center of the horizontal axis indicates a beam perpendicular to the image pickup element (or a beam on the optical axis of the principal focal point compensation optical system). And the right and left edges of the horizontal axis indicate beams on the most external sides of the beams to be incident on the same point of the image pickup element (or beams traveling along the lines of the maximum angle of field, or beams on the most external sides in the angle of field), respectively.

The distance between the primary mirror and the compensation optical system is 13455.0215 mm, and the amount of travel of the compound lens A1 is 20.8 mm.

When there is no relative tilt between the principal focal point compensation optical system 100 and the image pickup element C1, image performance is good throughout a range with a field of view of 1.5 degrees as apparent from FIGS. 5A to 5D.

Figure 6:
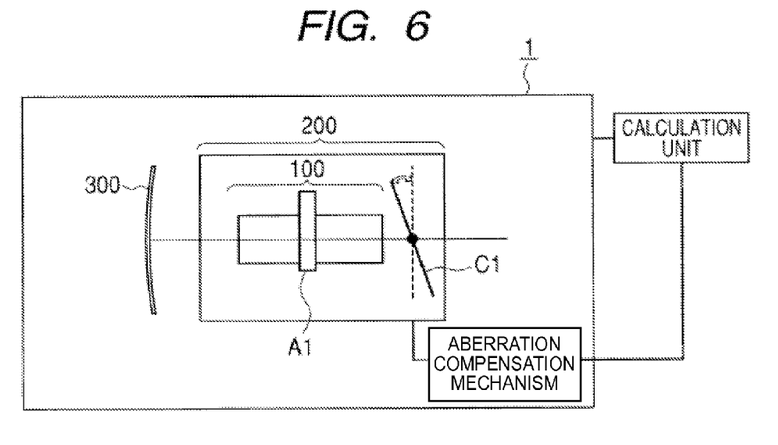
FIG. 6 is a conceptual view of the astronomical telescope upon occurrence of a relative tilt between the compensation optical system and the image pickup element.

FIG. 6 is a conceptual view when the lens barrel 200 tilts relative to the zenith to cause a relative tilt between the principal focal point compensation optical system 100 and the image pickup element C1.

Figure 7:
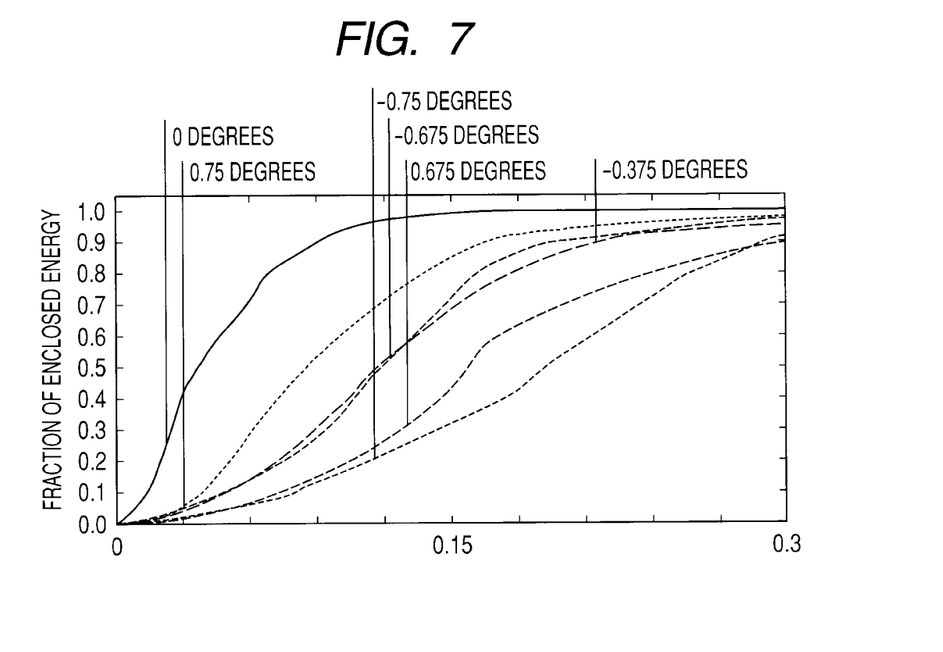
FIG. 7 is a graph illustrating imaging performance of the astronomical telescope according to the embodiment when the zenith angle is 30 degrees, the wavelength band ranges from 570 to 670 nm, and the relative tilt is 20 seconds.

FIG. 7 is an explanatory graph illustrating, like in FIG. 4, a relationship between viewing angle radius and incident energy when the relative tilt between the principal focal point compensation optical system 100 and the image pickup element C1 is 20 seconds on condition that the zenith angle is 30 degrees and the wavelength band ranges from 570 to 670 nm.

The horizontal axis represents values of angles of field (seconds) as star image radiuses on the image plane. The vertical axis represents the fraction of energy focused on the star image radiuses. The lines in FIG. 7 represent data at infinity with viewing angles of 0, −0.375, ±0.675, and ±0.75 degrees, respectively. The distance between the primary mirror 300 and the compensation optical system 100 is 13455.0210 mm, and the amount of travel of the compound lens A1 in a direction perpendicular to the optical axis is 20.0 mm.

As a result of occurrence of the relative tilt, the star image radius within which 80 percent of energy of light at each viewing angle falls becomes 0.257 seconds, degrading imaging performance compared to the case of FIG. 4 without tilt. In this case, even if the distance between the primary mirror 300 and the principal focal point compensation optical system 100 is adjusted or the compound lens A1 is moved, optical performance will not be improved significantly.

FIGS. 8A to 8D are lateral aberration graphs when the distance to object is infinitive when the relative tilt between the principal focal point compensation optical system 100 and the image pickup element C1 is 20 seconds on condition that the zenith angle is 30 degrees and the wavelength band ranges from 570 to 670 nm.

FIGS. 8A, 8B, 8C, and 8D represent cases where viewing angles are 0, 0.75, −0.75, and 0.675 degrees, respectively, in this order.

Figure 8A:
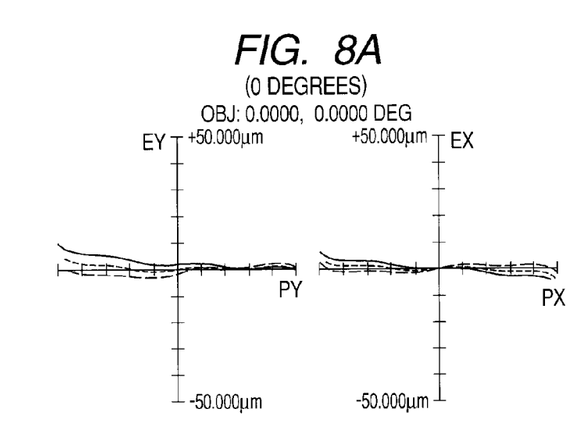
FIGS. 8A, 8B, 8C and 8D are lateral aberration graphs of the astronomical telescope according to the embodiment when the zenith angle is 30 degrees, the wavelength band ranges from 570 to 670 nm, and the relative tilt is 20 seconds.
Figure 8B:
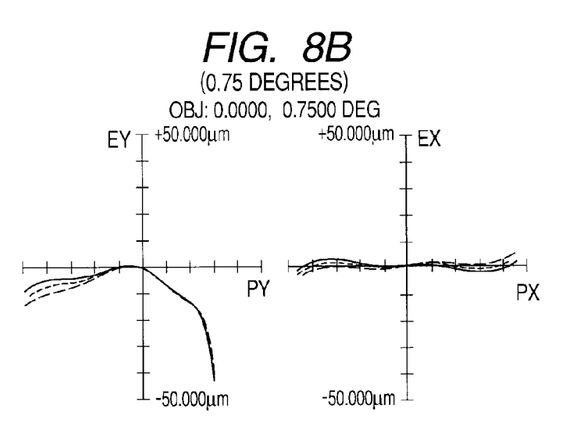
Figure 8C:
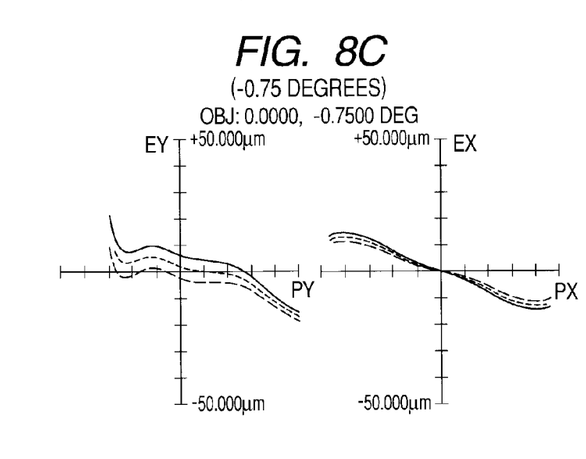
Figure 8D:
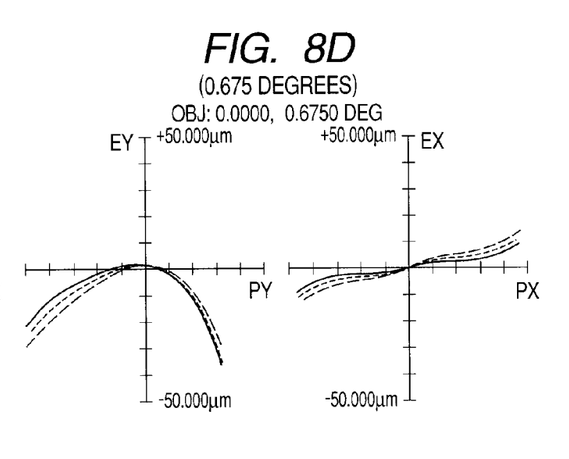

It is apparent from FIGS. 8B and 8C that the telescope is in focus at a viewing angle of 0.75 degrees and out of focus at a viewing angle of -0.75 degrees. One reason why imaging performance is degraded in the reflecting telescope 1 of FIG. 6 is due to decentering aberration caused by a tilt of the image pickup element (image plane) C1.

In the embodiment, the aberration compensation mechanism adjusts (displaces) the attitude of the lens barrel 200 to compensate the decentering aberration.

Figure 9:
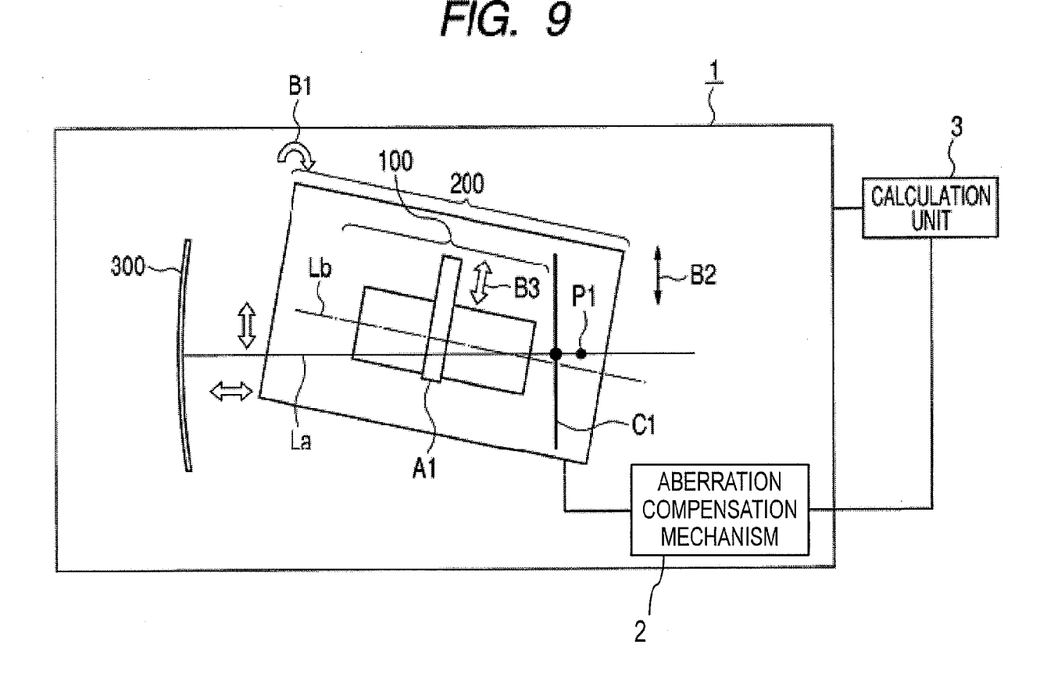
FIG. 9 is a conceptual view illustrating an attitude adjustment direction of the astronomical telescope according to the present invention.
Figure 10A:
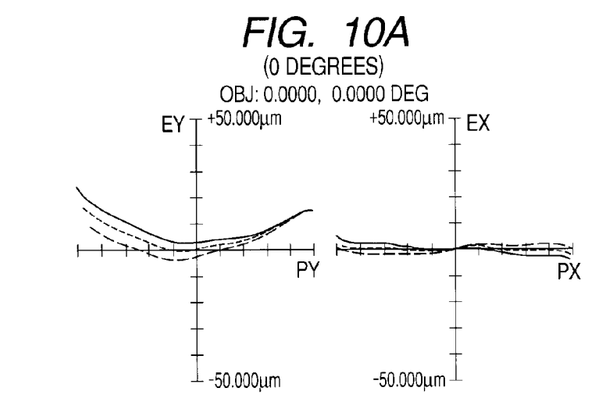
FIGS. 10A, 10B, 10C and 10D are graphs illustrating imaging performance of the astronomical telescope according to the embodiment when the present invention is applied on condition that the zenith angle is 30 degrees, the wavelength band ranges from 570 to 670 nm, and the relative tilt is 20 seconds.
Figure 10B:
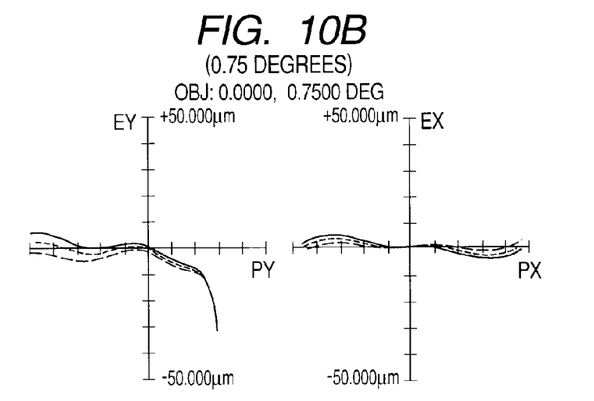
Figure 10C:
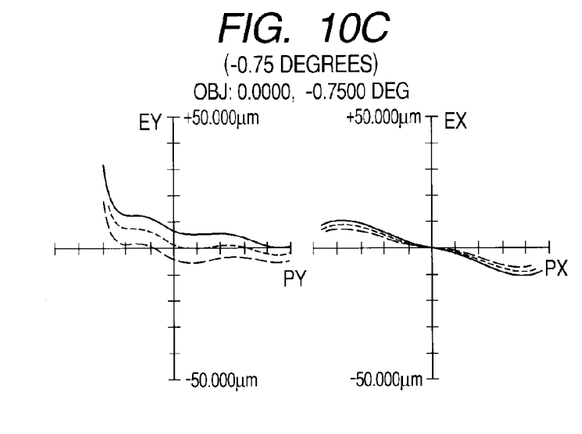
Figure 10D:
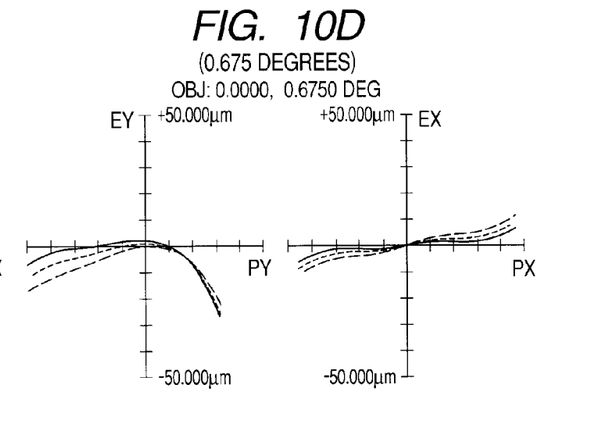

FIG. 9 is a conceptual view when the attitude corresponding to the relative tilt between the principal focal point compensation optical system 100 and the image pickup element C1 is adjusted.

In the embodiment, changes in relative tilt between the principal focal point compensation optical system 100 and the image pickup element C1 are made. Among the changes, a relative tilt between the image pickup element C1 and the principal focal point compensation optical system 100, which occurs due to self-weight deformation of the lens barrel 200 integrally supporting the image pickup element C1 and the principal focal point compensation optical system 100, is directly measured (determined) or indirectly calculated by a calculation unit 3. Although it is desirable that the self-weight deformation here include, in addition to the self-weight deformation of the lens barrel, self-weight deformation of a support part supporting the image pickup element, self-weight deformation of a support part supporting the lens barrel, and self-weight deformation of the drive mechanism for driving the lens barrel, it may be enough to include any one of them.

An aberration compensation mechanism 2 adjusts the attitude of the lens barrel 200 by means of a drive unit based on a signal from the calculation unit 3. Here, the signal from the calculation unit may be to represent the relative tilt or position between the image pickup element and the principal focal point compensation optical system, or the tilt of the entire telescope (or the principal focal point compensation optical system) such as the tilt thereof with respect to the zenith direction or horizontal direction. Basically, the signal desired here is information related to the change of the amount of self-weight deformation of the lens barrel 200 with respect to a state where the astronomical telescope is directed to the zenith. Therefore, the principal focal point compensation optical system may be driven based on information different from the information related to the above-mentioned relative tilt (or position) between the principal focal point compensation optical system and the image pickup element. For example, the above-mentioned relative tilt between the principal focal point compensation optical system and the image pickup element can be replaced by a direction (angle) in which the entire astronomical telescope is directed, or a direction (angle) in which the principal focal point compensation optical system is directed, so that the principal focal point compensation optical system will be driven based on the information.

A specific method in which a drive unit displaces the lens barrel 200 to adjust the attitude of the lens barrel 200 is as follows. Here, the lens barrel 200 integrally holds (supports) the principal focal point compensation optical system and the image pickup element, but the present invention is not limited thereto. The structure may be such that the components are held by different holding mechanisms, respectively, and these holding mechanisms are held by one holding mechanism.

While keeping the relative tilt state, the principal focal point compensation optical system 100 and the image pickup element C1 tilt (rotate) the lens barrel 200 as indicated by arrow B1 about an axis as an axis of rotation, which is drawn through a point on the optical axis, i.e., point P1 on the optical axis La, and is perpendicular to the optical axis La.

Then, the lens barrel 200 is moved to have a component perpendicular to the optical axis La of the primary mirror 300 as indicated by arrow B2.

Thus, the decentering aberration caused by a change in relative tilt between the principal focal point compensation optical system 100 and the image pickup element C1 is compensated well.

Next, in the embodiment, the chromatic aberration due to atmospheric dispersion is compensated by the compound lens A1 that forms part of the principal focal point compensation optical system 100.

Specifically, the compound lens A1 for atmospheric dispersion compensation is driven to have a component perpendicular to an optical axis Lb of the principal focal point compensation optical system 100 as indicated by arrow B3. Thus, the distance between the primary mirror 300 and the principal focal point compensation optical system 100 in the direction of the optical axis La is adjusted. The above-mentioned adjustment processes may be carried out in any order.

FIGS. 10A to 10D are aberration graphs when the present invention is applied on condition that the zenith angle is 30 degrees, the wavelength band ranges from 570 to 670 nm, and the relative tilt is 20 seconds. The lens barrel 200 is tilted by 14.4 seconds with respect to the optical axis La of the primary mirror 300, and the lens barrel 200 is further driven by 0.32 mm in the direction perpendicular to the optical axis La of the primary mirror 300. This results in a compensation for the development of aberration due to the relative tilt. Then, the compound lens A1 for atmospheric dispersion compensation is driven by 18.4 mm to have a component perpendicular to the optical axis La of the primary mirror 300.

In addition, the distance between the primary mirror 300 and the compensation optical system 100 is adjusted to 13455.018 mm to obtain good optical performance.

FIGS. 10A, 10B, 10C, and 10D represent cases where viewing angles are 0, 0.75, −0.675, and +0.675 degrees, respectively.

According to the present invention, focus is adjusted for the viewing angles of +0.75 and −0.75 degrees to compensate coma aberrations at wide viewing angles that cannot be compensated by the compound lens A1 for atmospheric dispersion compensation.

Figure 11:
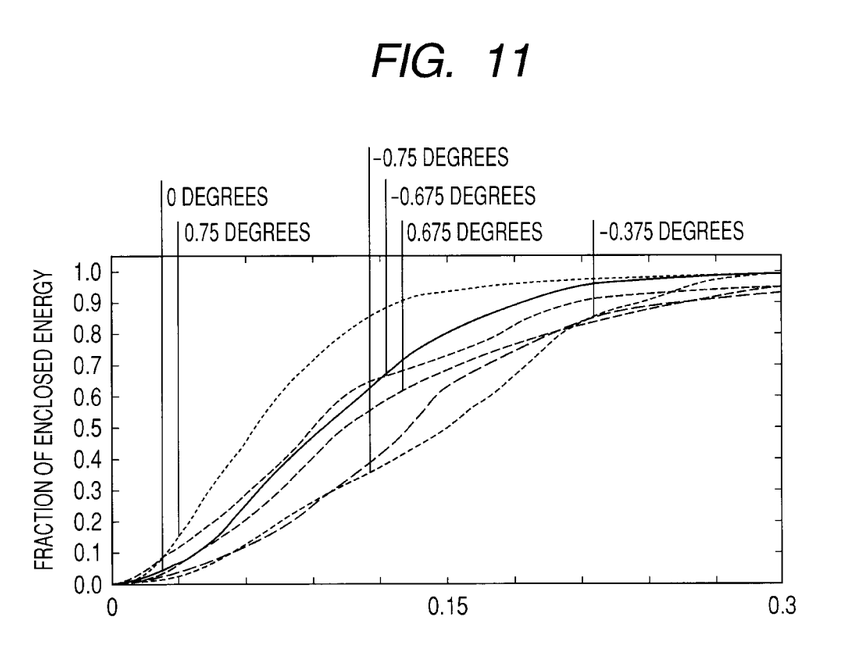
FIG. 11 is a lateral aberration graph of the astronomical telescope according to the embodiment when the present invention is applied on condition that the zenith angle is 30 degrees, the wavelength band ranges from 570 to 670 nm, and the relative tilt is 20 seconds.

FIG. 11 is an explanatory view illustrating imaging performance when the present invention is applied on condition that the zenith angle is 30 degrees, the wavelength band ranges from 570 to 670 nm, and the relative tilt between the principal focal point compensation optical system 100 and the image pickup element C1 is 20 seconds.

The horizontal axis represents values of angles of field (seconds) as star image radiuses on the image plane, and the vertical axis represents the fraction of energy focused on the star image radiuses.

The lens barrel 200 is tilted by 14.4 seconds with respect to the optical axis La of the primary mirror 300, and the lens barrel 200 is further driven by 0.32 mm in the direction perpendicular to the optical axis La of the primary mirror 300. This results in a compensation for the development of aberration due to the relative tilt. Then, the compound lens A1 for atmospheric dispersion compensation is driven by 18.4 mm to have a component perpendicular to the optical axis La of the primary mirror 300.

In addition, the distance between the primary mirror 300 and the compensation optical system 100 is adjusted to 13455.018 mm to obtain good optical performance. The lines in FIG. 11 represent data at infinity with viewing angles of 0, ±0.75, and ±0.675 degrees, respectively. In this case, since 80 percent of energy of light at each viewing angle is within a field of view of 0.20 seconds, imaging performance equivalent to that without relative tilt can be obtained.

In the aforementioned embodiment, the example in which the angle of view is 1.5 degrees is described, but the present invention can be implemented without limiting the angle of view to this value.

Further, in the embodiment, BSL7Y (with a refractive index nd of 1.51633 and an Abbe number υd of 64.2) and PBL1Y (with a refractive index nd of 1.54814 and an Abbe number υd of 45.8) are used as optical glasses of the lenses that form the compound lens A1. However, any other kinds of optical glasses are applicable as long as the two optical glasses that form the compound lens A1 have refractive indexes close to each other but different in dispersion.

Further, the aforementioned embodiment illustrates an example in which a compound lens, both sides of which are spherical with large curvature radiuses, is used as the compound lens A1 in such a manner that the compound lens will be moved in a direction orthogonal to the optical axis to compensate atmospheric dispersion.

However, any other type of compound lens may be used. For example, as described in U.S. Pat. No. 6,038,068, a compound lens, both sides of which are of concentric spherical shape, may be used in such a manner the compound lens will be rotated about the center of curvature thereof to compensate atmospheric dispersion.

The astronomical telescope of the aforementioned embodiment of the present invention includes the primary mirror (concave mirror) that forms part of the astronomical telescope, the image pickup element taking an image of a subject (astronomical object) the image of which is formed through this primary mirror (and other lenses), and a lens system (compensation optical system) arranged between the primary mirror and the image pickup element. Here, even if the lens barrel supporting the lens system deforms under the weight of the optical element such as the lens to change the relative position between the primary mirror and the image pickup element, the aberration compensation mechanism (which shifts or tilts the lens system in a direction perpendicular to the optical axis) compensates aberration changes made during the deformation. Since the astronomical telescope is thus structured, even if this astronomical telescope is tilted relative to the zenith during astronomical observation (during imaging by the image pickup element), the astronomical object (subject) can be observed under suitable conditions.

Further, in the aforementioned embodiment, the description is made of the entire telescope (astronomical telescope), but the present invention may be understood as a compensation optical system placed in such a telescope. The compensation optical system of the present invention is such that, based on information on the tilt of the entire telescope (or the compensation optical system), i.e., information related to tilt detection results or command values for tilt directions, the entire or part of the compensation optical system is translated or tilted. Specifically, the compensation optical system of the present invention is such that, based on the tilt of the telescope, the entire compensation optical system is tilted with respect to the optical axis, or part thereof is moved in a direction perpendicular to the optical axis (primary mirror).

According to the embodiment, degradation of imaging performance due to a relative tilt (or movement) between the image pickup element and the principal focal point compensation optical system caused when the astronomical telescope is tilted to observe an astronomical object other than the zenith can be suppressed.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2008-258253, filed Oct. 3, 2008, which is hereby incorporated by reference herein in its entirety.

What is claimed is:

1. A telescope comprising:
a concave mirror reflecting light from an object;
an image pickup element receiving light from the concave mirror;
a compensation optical system guiding light from the concave mirror to the image pickup element, wherein the image pickup element is configured to tilt relative to the compensation optical system and the concave minor in response to tilting of the telescope;
a lens barrel integrally holding the image pickup element and the compensation optical system; and
a drive mechanism driving the lens barrel to change an angle of an optical axis of the compensation optical system and an angle of the image pickup element with respect to an optical axis of the concave mirror to compensate for an aberration resulting from a change in relative tilt between the compensation optical system and the image pickup element.

2. The telescope according to claim 1, wherein the drive mechanism drives the lens barrel according to a tilt of the telescope or a tilt of the compensation optical system.

3. The telescope according to claim 1, wherein the drive mechanism drives the lens barrel in a direction perpendicular to the optical axis of the compensation optical system.

4. A telescope comprising:
a primary minor for imaging an astronomical object;
a compensation optical system for compensating for an aberration produced by the primary mirror;
an image pickup element for receiving light of a formed image, the image pickup element configured to tilt relative to the compensation optical system and the primary minor in response to tilting of the telescope;
a lens barrel for integrally housing and supporting the compensation optical system and the image pickup element such that adjustment of an attitude of the lens barrel changes an angle of an optical axis of the compensation optical system and an angle of the image pickup element with respect to an optical axis of the primary minor; and
an aberration compensation mechanism for adjusting an attitude of the lens barrel to compensate for an aberration resulting from a change in relative tilt between the compensation optical system and the image pickup element caused when the telescope is tilted to observe an astronomical object other than the zenith.

5. The telescope according to claim 4, wherein the aberration compensation mechanism includes a drive unit for rotating the lens barrel about an axis as an axis of rotation, which is drawn through a point on an optical axis of the primary minor and is perpendicular to the optical axis, and moving the lens barrel to have a component perpendicular to the optical axis of the primary minor.

6. The telescope according to claim 4, further comprising:
a calculation unit for directly measuring or indirectly calculating a relative tilt between the image pickup element and the compensation optical system caused, among relative tilts between the compensation optical system and the image pickup element, by self-weight deformation of a lens barrel integrally supporting the image pickup element and the compensation optical system,
wherein the aberration compensation mechanism adjusts an attitude of the lens barrel based on a signal from the calculation unit.

7. The telescope according to claim 4, wherein the compensation optical system has a compound lens including a pair of lenses made of materials different in dispersion from each other, and a drive unit for displacing the compound lens to have a component perpendicular to an optical axis of the compensation optical system.

8. A system placed inside a telescope having a concave minor reflecting light from an object, the system comprising:
an image pickup element receiving light from the concave mirror;
a compensation optical system guiding light from the concave mirror to the image pickup element, wherein the image pickup element is configured to tilt relative to the compensation optical system and the concave minor in response to tilting of the telescope;
a lens barrel integrally holding the image pickup element and the compensation optical system; and
a drive mechanism driving the lens barrel to change an angle of an optical axis of the compensation optical system and an angle of the image pickup element with respect to an optical axis of the concave mirror to compensate for an aberration resulting from a change in relative tilt between the compensation optical system and the image pickup element.

9. The system according to claim 8, wherein the drive mechanism drives the lens barrel according to a tilt of the telescope or a tilt of the compensation optical system.

10. The system according to claim 8, wherein the drive mechanism drives the lens barrel in a direction perpendicular to the optical axis of the compensation optical system.

* * * * *